United States Patent Office 3,716,294
Patented Feb. 13, 1973

3,716,294
ELECTROSTATIC QUICK COPYING APPARATUS
Wilhelm Josef Knechtel, Rodheim, and Detlef Schaffer, Wetzlar, Germany, assignors to Canon Kabushiki Kaisha, Tokyo, Japan
Filed July 8, 1970, Ser. No. 53,209
Claims priority, application Germany, July 10, 1969, P 19 35 025.5
Int. Cl. G03g 15/00
U.S. Cl. 355—3    11 Claims

ABSTRACT OF THE DISCLOSURE

An electrostatic quick copying device includes a drive roller for transporting photosensitive paper and two drive means for driving the roller at different speeds, i.e. fast and slow speeds, by a free wheel and a clutch, respectively. At least a pair of switches is disposed in the path of the photosensitive paper for engaging and disengaging the clutch, whereby the photosensitive paper is slowly moved for a short time during exposure so as to enable the exposure to be accomplished by at least one xenon flash means.

FIELD OF THE INVENTION

This invention relates to electrostatic quick copying apparatus by which the image of an original is optically formed on a photosensitive paper, photosensitive foil or like member which is passed through the apparatus.

DESCRIPTION OF THE PRIOR ART

According to a first group of known apparatus, photosensitive paper is maintained stationary during exposure to maintain an optical image thereon for a time sufficient for the formation of a corresponding electrostatic image on the paper. This type of apparatus reduces the copying speed.

According to another group of known apparatus, photosensitive paper is moved at a uniform speed during exposure and the image formation is accomplished by short time energization of flashlights (xenon flashlights).

Since the exposure of photocopying paper requires a minimum quantity of light, care should be taken in these known apparatus to provide sufficient light for the image formation. Suitable means for this purpose makes such apparatus expensive.

In addition, care should be taken to greatly reduce the time required for the photoexposure, because the image formed on the photosensitive paper would otherwise disappear.

An object of the present invention is to provide an apparatus which does not require a great expense for the reduction of the exposure time and does not require stopping the photosensitive paper during the exposure process.

Such an object of the present invention can be achieved by momentarily decelerating the photosensitive paper during exposure and exposing the paper with at least one xenon flashlight during this period.

This method further has advantage in that no severe requirement is imposed for accuracy of the flashing time, because a sufficiently short lapse of time can be provided for the flashing to take place.

Thus, the speed of the photosensitive paper during exposure can be selected so that, on the one hand, a sufficient quantity of light may be used for the exposure and, on the other hand, the optical image on the photosensitive paper may be maintained thereon for a time sufficient for the formation of a corresponding electrostatic image on the paper. If the photosensitive paper is moved quickly, for example at a speed of 30 cm. per second before and after it is exposed to light, a copy can be formed essentially faster than by the apparatus which have required the photosensitive paper to be stopped for the exposure process, and the time required to prepare a copy is substantially the same as that in the apparatus of the type in which the photosensitive paper is moved at a uniform speed even during the exposure process.

This quick copy formation is especially effective in the cases where many copies of the same original must be prepared.

The transport of the photosensitive paper is accomplished by the use of a drive roller, as usual. Therefore, the drive roller is suitably controlled.

According to the arrangement of the present invention, two drive forces at different speeds are imparted to at least one drive roller of the standard type, one of the drive forces being transmitted to the roller through a free wheel and the other drive force being transmitted to the roller through a clutch.

In this arrangement, the two drives may be connected to a common motor, so that the clutch is convenient for quick drive and the free wheel is convenient for the deceleration of the other drive. When the clutch is engaged, the roller is quickly driven and accordingly the photosensitive paper is also transported quickly. The slow drive does not interfere with the quick drive because of the presence of the free wheel.

When the clutch is disengaged, the quick drive is interrupted and the slow drive becomes effective.

For the purpose of control, at least a pair of switches are conveniently provided in the path of the photosensitive paper. One of the switches engages the clutch and the other switch disengages the clutch. These switches are preferably operated in accordance with the position of the forward end of the moving paper relative thereto.

In order that the photosensitive paper may be slowly moved only during exposure, and for the reason that a predetermined period of time is required to change the speed of the photosensitive paper, the switches are spaced apart from each other to such a degree that the desired exposure speed is obtained just at the time when the paper has reached the second of the switches.

In another form of the present invention, the second switch turns on the flashlight and simultaneously therewith engages the quick drive circuit. Photoexposure is effected while the clutch is engaged, and accordingly while the paper is moved slowly.

Sometimes paper sheets of various sizes such as DIN $A_4$ or $A_5$ are passed through the apparatus, and therefore, in still another form of the present invention, a plurality of pairs of switches are provided. The respective switch pairs correspond to the respective sizes of the paper sheets and they are suitably selected for operation.

In yet another form of the present invention, there is provided at least one endless belt driven in the exposure plane for transporting the paper during exposure.

Instead of such a single belt, it has been found that two belts disposed in laterally spaced relationship may advantageously be employed and the switches may be disposed in the clearance between the two belts.

Because switches of each pair are disposed successively in the direction of movement of the photosensitive paper and because each switch has spatial dimensions, it is not feasible to arrange these switches in as closely adjacent relationship as desired. In a further form of the present invention, at least three belts are provided in laterally spaced relationship to one another and one of the switches of each pair is disposed in the clearance between the first and second belts while the other switch of each pair is disposed in the clearance between the second and third belts. Thus, each of the switches forming each pair is disposed in spatially separate relationship but has the same function as when they are disposed in closely adjacent relationship.

The use of the transport belts is not restricted by such spaced arrangement of the switches.

If a transport belt is provided, paper will usually be sucked to the belt. It has been found that such an arrangement is not sufficient to reliably secure the paper to the belt when the paper is moving quickly and rapid change of the speed is required. It has also been found that this is a result of too low negative pressure developed at the back of the paper. On the other hand, however, this pressure cannot become greater than one atmosphere.

To increase stability in such cases, a further embodiment of the present invention employs a fan disposed in front of the paper to blow the paper against the belt. Such a fan can produce a pressure difference essentially greater than one atmospheric pressure, in accordance with the output thereof.

It has been found that any commercially available microswitch, if used, injures the photosensitive paper because the forward end of the paper moves very quickly through the apparatus and strikes the switch at a high speed.

It is therefore another object of the present invention to provide means for avoiding such injury.

This object can be achieved according to the present invention by using switches operative without contacting the paper.

It has been found that such switches should advantageously be disposed so as to emit relatively sharp beams of light into the path of the paper obliquely with respect thereto and should be provided with a photoelectric element disposed in a reflection plane at an angle of reflection with respect to the moving paper.

Such an arrangement produces the following results. When the paper is disposed in the path of light from the source of light to the photoelectric element, the photoelectric element receives light via the paper and acts as a conductive switch.

If the paper is not disposed in the path of light from the source of light to the photoelectric element, the light from the source of light will travel to infinity and the photoelectric element will not receive light.

It has been found convenient to provide two tubular receptacles inclined to each other at an angle of reflection. A source of light and a photoelectric element are disposed in the respective tubular receptacles at one end thereof.

Such tubular receptacles may be formed as bores in a unitary structure, whereby the entire switch may have a compact structure.

This switch has a further advantage in that the paper passing the switch is not injured as in the case of the microswitch.

Where the photosensitive paper is illuminated by an optical image forming system, the switch should advantageously be disposed at the back of the exposed paper as viewed in the direction of the image forming light, whereby the switch will not interfere with the image formation.

The invention will now be described with respect to various embodiments thereof shown in the accompanying drawings.

DESCRIPTION OF THE PREFERRED EMBODIMENTS

Figure 1:
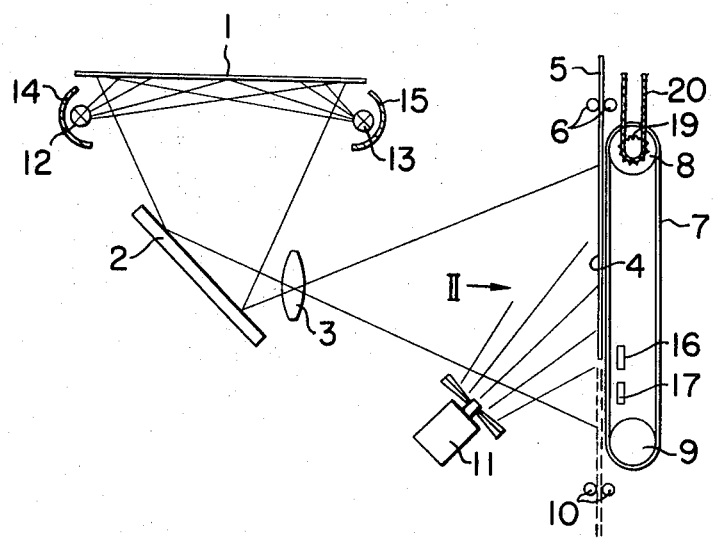
FIG. 1 is a schematic side view of the apparatus according to the present invention.

Referring to FIG. 1, an original 1 has its optical image formed in a plane 4 by a mirror 2 and an objective lens 3. Photosensitive paper 5 is electrostatically charged and passes through the plane 4. When the photosensitive paper is exposed to light, there is formed thereon an electrostatic latent image, which may be developed by a device not shown.

A pair of transport rollers 6 feed the paper 5 to the exposure plane 4, where the paper is conveyed by an endless belt 7 driven by a roller 8 over roller 9. After passing through the exposure plane 4, the photosensitive paper is carried away by another pair of transport rollers 10.

A fan 11 is provided to blow air against the paper 5 so as to maintain the paper 5 firmly in contact with the belt 7 while it is moving in the exposure plane 4.

Exposure is accomplished by two xenon tubes 12 and 13 which are turned on at the same time. Behind the xenon tubes 12 and 13 there are disposed mirrors 14 and 15, respectively, to increase the efficiency of luminescence. Behind the exposure plane there are disposed two switches 16 and 17. When the forward end of the paper 5 reaches switch 16, the paper 5 decreases in its speed of movement as will be described later. When the forward end of the paper 5 reaches switch 17, the paper 5 increases in its speed of movement and simultaneously therewith the xenon tubes 12 and 13 are turned on to effect exposure.

Figure 2:
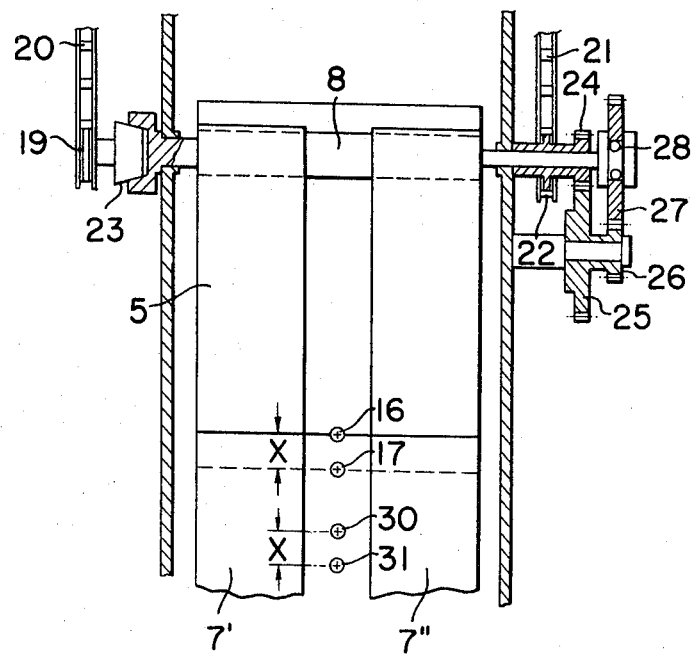
FIG. 2 is a front view taken in the direction of arrow II in FIG. 1.

The transport roller 8 is driven through a sprocket 19 and a chain 20. As seen in FIG. 2, the transport roller 8 is also driven through a chain 21 and a sprocket 22. The chains 20 and 21 are connected to a common drive motor (not shown).

The sprocket 19 drives the roller 8 through a magnetic clutch 23. The sprocket 22 is connected to a gear 24, which is in mesh engagement with a large gear 25 which in turn is connected to a small gear 26. The gear 26 is in mesh engagement with a large gear 27 which has a free wheel 28 incorporated therein. The gear 27 drives the roller 8 through the free wheel 28.

When the clutch 23 is activated, the roller 8 is rotated at high speed. At this instant, while there is a slow drive acting through the chain 21 and the reduction gears 24 to 27 provided between the chain 21 and the roller 8, this drive does not act through free wheel 28 on the roller. Rather, the free wheel 28, being a mechanically overridable element, permits the roller 8 to rotate at high speed under drive input from clutch 23 in spite of the slow drive acting through the chain 21.

When the clutch 23 is deactivated, the high speed drive to roller 8 from chain 20 is interrupted. In this case, roller drive is provided by chain 21, whereby the roller 8 is now rotated slowly.

The clutch 23 is controlled by the switches 16 and 17. In FIG. 2, the switches 16 and 17 are again shown schematically. It will be seen that when the photosensitive paper 5 reaches the switch 16, this switch is operated. Thus, the switch 16 deactivates the clutch 23 to thereby transport the paper 5 slowly. When the forward end of the paper 5 reaches the switch 17, the clutch 23 is again activated. Since this requires a predetermined period of time, the xenon tubes 12 and 13 are turned on simultaneously in this position, whereby the paper 5 is exposed to light while it is moving slowly.

The switches 16 and 17 are disposed with a spacing $x$ therebetween, which spacing is sufficent to decelerate the movement of the paper so that a predetermined speed of the paper may be obtained during the photoexposure. In FIG. 2, switches 30 and 31 are further provided in the path of the paper.

The switches 16 and 17 or 30 and 31 are operated by means not shown. The second pair of switches 30 and 31 are adapted to allow a paper sheet of different dimensions to be exposed in the apparatus.

In FIG. 2 it is seen that the transport belt 7 is divided into two separate belts 7' and 7" with a clearance therebetween and the switches 16, 17, 30 and 31 are all disposed in that clearance.

Figure 3:
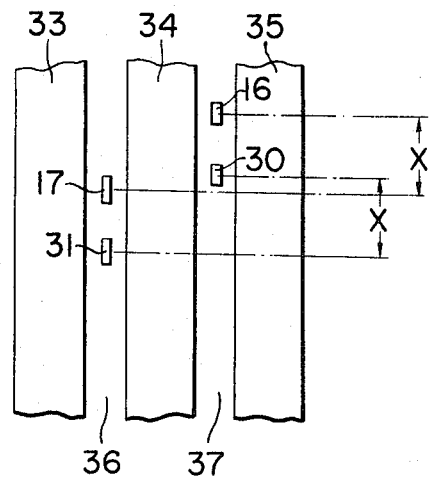
FIG. 3 shows a modified form of the arrangement according to the present invention.

Referring to FIG. 3, the belt 7 is divided into three separate belts 33, 34 and 35 with clearances 36 and 37 therebetween.

The switch 16 is disposed in one of the two clearances and the associated switch 17 in the other clearance. The spacing between these switches is again $x$ as viewed in the direction of movement of the paper.

Similarly, the second pair of switches are arranged such that one of them 30 is disposed in the clearance 37 and the other switch 31 is disposed in the clearance 36.

It will be seen that such staggered arrangement can minimize the spacing $x$.

Figure 4:
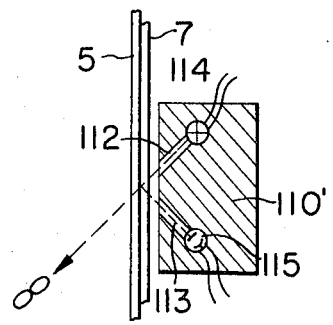
FIG. 4 is a fragmentary view showing a portion of FIG. 1.

FIG. 4 shows a switch 110' which may be employed for switches 16, 17, 30 and 31. This switch is a unitary structure having two tubular receptacles 112 and 113 formed therein. A source of light 114 is disposed in the receptacle 112 at one end thereof and a photoelectric element 115 is disposed in the receptacle 113 at one end thereof. The receptacles 112 and 113 are inclined with respect to each other so that when the paper is passing over the switch the light emitted from the source of light 114 through the receptacle 112 is reflected by the surface of the paper and enters the receptacle 113 to energize the photoelectric element 115.

When there is no paper moving in front of the switch element 110', the light from the source of light 114 is directed to infinity.

What is claimed is:

1. Apparatus for use in electrophotographic copying comprising:
   (a) illuminating means responsive to a first control signal to provide a light image of an original at an exposure station in said apparatus;
   (b) transport means for providing continuous transport of a photosensitive sheet to and through said exposure station;
   (c) means for driving said transport means including first and second means for moving said transport means in the same direction at respectively different speeds, said second means including mechanically overridable means connected to said transport means, said first means including third means for engaging said first means and said transport means and responsive to said first control signal to disengage said first means and said transport means; and
   (d) detector means responsive to first predetermined transport of said sheet to generate said first control signal.

2. The apparatus claimed in claim 1 wherein said detector means includes a first switch positioned in said apparatus along the path of transport of said sheet, said first switch generating said first control signal.

3. The apparatus claimed in claim 1 wherein said third means is further responsive to a second control signal for said engaging of said first means and said transport means and wherein said detector means is further responsive to second predetermined transport of said sheet to generate said second control signal.

4. The apparatus claimed in claim 3 wherein said detector means includes first and second switches positioned in said apparatus along the path of transport of said sheet and displaced from one another in said direction of movement of said transport means, said first and second switches respectively generating said first and second control signals.

5. The apparatus claimed in claim 1 wherein said third means includes an electromagnetic clutch for said engaging of said first means and said transport means and wherein said mechanically overridable means comprises a free wheel.

6. The apparatus claimed in claim 1 wherein said transport means includes a drive roller and an endless belt driven by said drive roller, said belt defining a surface for receiving said sheet.

7. The apparatus claimed in claim 4 wherein said transport means includes a drive roller and a plurality of endless belts driven by said drive roller and spaced from one another along the axis of said drive roller, each of said belts defining a surface for receiving an expanse of said sheet, said first and second switches each being positioned between a different adjacent pair of said belts.

8. The apparatus claimed in claim 5 including a common drive source for said first and second means.

9. The apparatus claimed in claim 6 further including means directing an air stream onto said belt for maintaining said sheet thereon.

10. The apparatus claimed in claim 2 wherein said switch comprises a light source emitting light in a direction oblique to said transport path and a photoelectric element positioned in said apparatus to receive light emitted by said source and reflected by said sheet.

11. The apparatus claimed in claim 10 including a common housing for said light source and said photoelectric element, said housing defining first and second tubular receptacles each obliquely disposed relative to said transport path for respectively supporting said light source and said photoelectric element.

References Cited

UNITED STATES PATENTS

| | | | |
|---|---|---|---|
| 3,495,903 | 2/1970 | Morley et al. | 355—4 X |
| 3,428,397 | 2/1969 | Elmer | 355—11 |
| 3,473,035 | 10/1969 | Gardner et al. | 271—47 X |
| 3,418,047 | 12/1968 | Lee et al. | 355—13 X |
| 3,547,534 | 12/1970 | Akiyama et al. | 355—10 X |

SAMUEL S. MATTHEWS, Primary Examiner

R. L. MOSES, Assistant Examiner

U.S. Cl. X.R.

271—46; 355—14, 68, 73